United States Patent Office 2,729,917
Patented Jan. 10, 1956

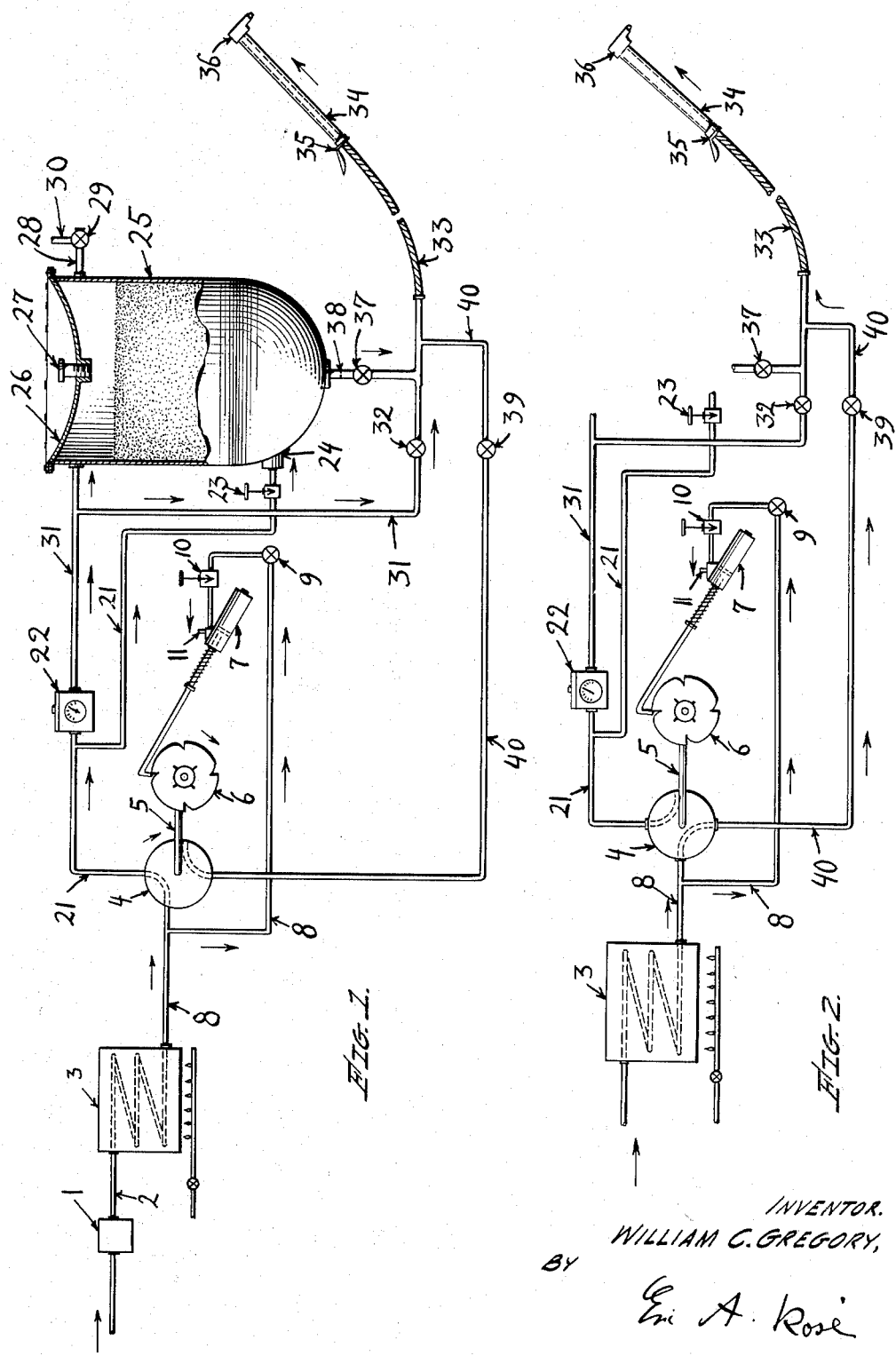

2,729,917

CLEANING APPARATUS

William C. Gregory, Compton, Calif.

Application June 30, 1953, Serial No. 365,219

8 Claims. (Cl. 51—8)

My invention relates to improvements in cleaning apparatus, and particularly to apparatus designed to clean by compressed air and abrasive blasting electrically energized equipment and electrical transmission line insulators; and the objects of my invention are, first, to provide an arrangement and construction of a cleaning apparatus adapted to permit the cleaning by the use of compressed air and abrasive blasts of electrically energized equipment and insulators without the necessity of interrupting the high voltage transmission of electric current; second, to afford facilities to clean by the use of compressed air and abrasive blasts fully energized high voltage equipment and electrical transmission line transmitters with absolute safety by the operator of the apparatus; third, to provide effective means for cleaning by the use of compressed air and abrasive blasts high voltage electrical transmission line equipment and insulators by providing automatically operating equipment permitting alternate blasts of compressed air and abrasives respectively; and fourth, to provide automatically operating cleaning apparatus for alternate compressed air and abrasive blasts of energized high voltage transmission equipment and insulators which is simple, inexpensive to manufacture, and fully automatic.

Additional objects, together with further advantages derived in utilizing the present invention will become apparent from the following detailed description thereof taken together with the accompanying drawing forming part of the specification, in which—

Figure 1 is a schematic pipeline diagram, partly in perspective and broken away and in section showing the apparatus in position for abrasive blasting;

Figure 2 is a schematic pipeline diagram showing a portion of my apparatus in position for compressed air blasting.

Similar numerals refer to similar parts throughout the several views.

The cleaning apparatus comprises a mechanical air filter and dehydrator 1, connected by suitable pipeline 2, to a heater or chemical dehydrator 3, the output of which is piped to a three way pipe valve 4, rotatably affixed to a shaft 5, connected by suitable gear arrangement to a ratchet wheel 6, operated by a piston operated air cylinder 7, and suitable pipelines 8, 8, connecting the heater or chemical dehydrator 3, to the three way pipe valve 4, and to the air cylinder 7, through a relief valve 9, and a needle valve 10. A bleeder opening 11, is provided on the intake side of the air cylinder 7.

Suitable piping 21, connects one output opening of the three way pipe valve 4, to an air pressure regulator 22, and also by way of a T-connection through a needle valve 23, to a compressed air operated vibrator 24, located in the lower portion of a pressure vessel 25, which vessel 25, is used for storing and disbursing abrasive materials.

The pressure vessel 25, is provided at the top position with an inverted head 26, having a screw plug 27, in the center thereof, and a pipe connection 28, near the top of the pressure vessel 25, connects to a relief valve 29, to which a safety valve 30, is connected in series.

The output of the air pressure regulator 22, connects directly to the top of the pressure vessel 25, by suitable pipeline 31, and further by way of a T-connection, the same pipeline 31, is connected through a check valve 32, to a flexible abrasive resistant hose 33, which in turn is attached to a hollow non-conductive rod 34, having a shutoff valve 35, attached to the connecting end of the rod and a nozzle 36, made of non-conductive material, attached at the other end of the rod.

Between the check valve 32, and the end of the pipeline 31, which is attached to the flexible abrasive resistant hose 33, a T-connection connects the pipeline 31, through a pipe valve 37, to the bottom of the pressure vessel 25. Between the pipe valve 37, and the bottom of said pressure vessel 25, an orifice 38, restricts the flow of abrasives from the bottom of the pressure vessel 25, to the pipe valve 37. Between the last named T-connection and the flexible abrasive resistant hose 33, the pipeline 31, passes through a second T-connection, the free end of which connects to a pipeline 40, attached through a check valve 39, to the third remaining opening of the three way pipe valve 4.

In operation, the operator opens shutoff valve 35, illustrated in Figure 1, and compressed air at approximately 110 p. s. i. pressure enters the mechanical air filter and dehydrator 1, and passes through the pipeline 2, to the heater or mechanical dehydrator 3. From the heater or mechanical dehydrator 3, the dehydrated compressed air passes through the pipeline 8, and through the three way pipe valve 4, as illustrated in Figure 1, through pipe connection 21, through the air pressure regulator 22, preset at 45–55 p. s. i. pressure, through the pipeline 31, to the top of the pressure vessel 25. Through the pipeline 21, ahead of the pressure regulator 22, compressed air flows also through the needle valve 23, to the compressed air operated vibrator 24, the needle valve 23, having been preset to a pressure suitable for the operation of said vibrator 24. Compressed air at 45–55 p. s. i. pressure further flows in the pipeline 31, from the output side of the air pressure regulator 22, through the check valve 32, and flexible hose 33, to the shutoff valve 35, and through the hollow non-conductive rod 34, to the nozzle 36. Abrasives are mixed with the compressed air through the orifice 38, and the valve 37. Air pressure is equalized in the top of the pressure vessel 25, and the pipeline 31, at 45–55 p. s. i. pressure. The operation of the vibrator 24, assures a steady flow of abrasives into the pipeline 31, and through the flexible hose 33.

When the operator shuts off the shutoff valve 35, back pressure will build up in the pipelines 31, 21 and 8, and pressure in the pipeline 8, connecting to the heater or mechanical dehydrator 3, will back up to 110 p. s. i., passing compressed air through the check valve 9, preset to operate at 90 p. s. i. pressure, and compressed air will enter through said check valve 9, the air cylinder, where it will move the piston against the spring tension, which piston in turn will move the ratchet wheel 6, one-quarter turn and place the three way valve 4, in the position illustrated in Figure 2.

If the operator again opens the shutoff valve 35, compressed air will flow through the heater or mechanical dehydrator 3, through pipeline 8, to the three way valve 4, as illustrated in Figure 2, and through pipeline 40, through the check valve 39, preset at approximately 70 p. s. i. pressure, through the flexible hose 33, and shutoff valve 35, to the nozzle 36. With the shutoff valve in the open position, the flow of compressed air will decrease the pressure in the line and the air at the air cylinder 7, will bleed off through the bleeder opening 11, and the piston will return to the next groove in the ratchet wheel 6, by action of the spring attached to the piston.

The operator having used compressed air to clean off abrasives deposited on the electrical equipment, will close the shutoff valve 35, and back pressure of 110 p. s. i. will again operate the air cylinder, causing the wheel to turn one-quarter turn and to move the three way valve again to the position illustrated in Figure 1, ready for blasting with abrasives.

The operator can therefore blast alternately with compressed air alone and with abrasives entirely by remote control, and during the blasting with compressed air alone, the circuit providing the abrasives mixture is at complete rest.

It is understood that the three way pipe valve may be operated manually, if desired, and various arrangements may be substituted in place and stead of the pressure vessel storing and distributing the abrasives.

While specific forms of my invention have been described, it is therefore understood that the same may be modified without departing from the spirit of my invention.

I claim:

1. In an apparatus of the class described, comprising a three way pipe valve attached to a source of dehydrated compressed air, compressed air driven means adapted to rotate said three way pipe valve one-quarter turn during each operation, a hollow non-conducting rod having a nozzle attached to one end and a shutoff valve attached to the other, pipe connecting means connecting the three way pipe valve to the shutoff valve, a pressure vessel having a top portion and a bottom portion and installed in said bottom portion a compressed air operated vibrator and an outlet opening for moving an orifice, an air pressure regulator connected to the top portion and the bottom portion of the pressure vessel, pipe connecting means between the bottom portion of the pressure vessel and the shutoff valve and pipes connecting the three way valve to the air pressure regulator and to the vibrator.

2. A cleaning apparatus comprising a source of dehydrated compressed air, a pressure vessel having an outlet opening in the shape of an orifice and a vibrator installed in the bottom of said pressure vessel, a hollow non-conducting rod having a shutoff valve, pipe connecting means connecting said shutoff valve to said source of dehydrated air supply and to said orifice, and means for alternately connecting and disconnecting said pressure vessel by means of operation of the shut-off valve from the line connecting the shutoff valve to the dehydrated compressed air supply.

3. In combination, a three way pipe valve attached to a source of dehydrated compressed air, means for rotating said three way pipe valve one-quarter turn during each operation, a hollow non-conducting rod having a nozzle attached to one end and a shutoff valve attached to the other, a pipe connection connecting the three way pipe valve to the shutoff valve, a pressure vessel having a top portion and a bottom portion and installed therein a vibrator and an outlet opening having an orifice, an air pressure regulator having pipe connections connecting it to the top portion of the pressure vessel and the bottom portion of the pressure vessel, pipe connections between the bottom portion of the pressure vessel and the shutoff valve and pipe connections connecting the three way valve to the air pressure regulator and to the vibrator.

4. In a combination, a source of dehydrated compressed air, a hollow non-conducting rod having a shutoff valve attached to one end, means connecting said shutoff valve to said source of dehydrated compressed air, a pressure vessel having a top portion and a bottom portion and installed in said bottom portion a vibrator and an outlet opening having an orifice, an air pressure regulator having pipe connections to the top portion and the bottom portion of said pressure vessel, pipe connections between the bottom portion of the pressure vessel and the shutoff valve, means connecting the air pressure regulator and the vibrator to said source of dehydrated compressed air, and means adapted to alternately cause said compressed air during one operation to flow through said shutoff valve and during the next operation to cause said compressed air to operate said vibrator and cause it to be mixed with abrasives originating in the pressure vessel and causing it to become mixed with the compressed air through said orifice, and to pass through said shutoff valve.

5. In combination, a three way pipe valve attached to a source of dehydrated compressed air, means adapted to rotate said three way pipe valve one-quarter turn during each operation, said means comprising an air cylinder communicating with the source of dehydrated air supply through air pressure regulatory means and actuated automatically by such controlled air pressure, a shutoff valve connected to said three way pipe valve, means storing abrasives, means connecting said last-named means to said three way pipe valve and to said shutoff valve, and means adapted to pass said dehydrated compressed air alternately directly to the shutoff valve in one operation and to said shutoff valve through said last-named means during the next operation.

6. In combination, a source of dehydrated compressed air, a shutoff valve connected to said source of dehydrated compressed air, means storing abrasives, means connecting said last-named means to said source of dehydrated compressed air and to said shutoff valve, and means adapted to pass said dehydrated compressed air alternately directly to the shutoff valve in one operation and to said shutoff valve through said last-named means during the next operation, said means comprising an air cylinder communicating with the source of dehydrated air supply through air pressure regulatory means and actuated automatically by such controlled air pressure.

7. In an apparatus of the class described, comprising a three way pipe valve attached to a source of dehydrated air supply, a shutoff valve communicating through pipe connecting means with said three way pipe valve, a pressure vessel having a top portion and a bottom portion and installed in said bottom portion a vibrator and an outlet having an orifice, pipe connecting means between the bottom portion and the shutoff valve and between the three way valve and the vibrator.

8. In combination, a source of dehydrated air supply, a shutoff valve connected to said air supply, a pressure vessel having a top portion and a bottom portion and installed in said bottom portion an outlet having an orfice, a vibrator affixed to the bottom portion, an air pressure regulatory means regulating the air pressure in the bottom and top portions respectively, pipe connections connecting the bottom portion to the shutoff valve, means connecting the vibrator and air pressure regulatory means to the source of dehydrated air supply, and means to cause selectively said compressed air to flow through said shutoff valve or to flow through said vibrator and cause said air to be mixed with abrasives originating in the pressure vessel and causing it to become mixed with the compressed air through said orifice and to pass through said shutoff valve.

References Cited in the file of this patent

UNITED STATES PATENTS

| | | |
|---|---|---|
| Re. 23,186 | Mead | Jan. 3, 1950 |
| 1,858,475 | Wolever | May 17, 1932 |
| 2,388,818 | Bick | Nov. 13, 1945 |